United States Patent [19]

Yamada et al.

[11] Patent Number: 4,741,227
[45] Date of Patent: May 3, 1988

[54] TRACTOR TRANSMISSION TO PERMIT SMOOTH CHANGE OF SPEED OPERATION EFFECTUATED BY ROTATIONAL RESISTANCE

[75] Inventors: Shunzo Yamada, Kishiwada; Satoshi Fujita, Sakai; Kiyokazu Nakanishi, Kawchinagano, all of Japan

[73] Assignee: 501 Kubota, Ltd., Osaka, Japan

[21] Appl. No.: 937,114

[22] Filed: Dec. 2, 1986

[30] Foreign Application Priority Data

Jun. 19, 1986 [JP] Japan .............................. 61-93674[U]
Jun. 19, 1986 [JP] Japan .............................. 61-93676[U]
Jun. 19, 1986 [JP] Japan .............................. 61-93671[U]

[51] Int. Cl.$^4$ ............................................. F16H 37/06
[52] U.S. Cl. ..................... 74/664; 74/15.86; 74/411.5; 74/745; 188/290; 192/48.8
[58] Field of Search ............... 74/664, 665 GA, 411.5, 74/15.86, 15.82, 15.8, 745, 665 G; 188/290; 192/48.9, 48.8, 48.5

[56] References Cited

U.S. PATENT DOCUMENTS

| | | | |
|---|---|---|---|
| 2,237,322 | 4/1941 | West | 192/48.8 |
| 2,261,432 | 11/1941 | Cooke | 192/48.8 |
| 2,607,548 | 8/1952 | Hollander | 188/290 X |
| 3,185,274 | 5/1965 | Maurice | 192/48.8 |
| 3,618,416 | 11/1971 | Longshore | 74/363 X |
| 3,745,847 | 7/1973 | Worner et al. | 74/411.5 X |
| 3,841,455 | 10/1974 | Eastwood | 192/48.8 X |
| 4,326,597 | 4/1982 | Murayama et al. | 74/745 X |
| 4,360,091 | 11/1982 | Sada et al. | 188/290 X |
| 4,513,473 | 4/1985 | Omata | 188/290 X |
| 4,522,394 | 6/1985 | Broussard | 74/411.5 X |
| 4,527,675 | 7/1985 | Omata et al. | 188/290 |
| 4,565,102 | 1/1986 | Miyahara et al. | 74/15.86 X |
| 4,610,174 | 9/1986 | Takagi et al. | 74/15.8 X |
| 4,628,768 | 12/1986 | Omura et al. | 74/745 |
| 4,655,327 | 4/1987 | Tomioka et al. | 188/290 |

FOREIGN PATENT DOCUMENTS

| | | | |
|---|---|---|---|
| 589103 | 2/1959 | Italy | 74/15.86 |
| 112368 | 9/1978 | Japan | 74/15.86 |
| 56-12142 | 7/1979 | Japan . | |
| 151600 | 8/1984 | Japan | 74/411.5 |
| 2027501 | 2/1980 | United Kingdom | 74/15.86 |

*Primary Examiner*—Leslie A. Braun
*Assistant Examiner*—Dwight G. Diehl
*Attorney, Agent, or Firm*—Webb, Burden, Robinson & Webb

[57] ABSTRACT

A transmission system for a tractor comprising a double clutch for transmitting engine output to an inner shaft consitituting part of a propelling line and to a tubular outer shaft constituting part of a power takeoff line. The double clutch includes a first and second flywheels, and the second flywheel defines a boss for relatively rotatable supporting a forward end of the outer shaft therein. The transmission system further comprises a propelling line change speed mechanism including a reversing gear and a reversing shaft for supporting the reversing gear. A rotational resistance applying device is provided on the reversing shaft for applying a rotational resistance to the propelling line by frictional engagement with the reversing gear.

7 Claims, 7 Drawing Sheets

TRACTOR TRANSMISSION TO PERMIT SMOOTH CHANGE OF SPEED OPERATION EFFECTUATED BY ROTATIONAL RESISTANCE

BACKGROUND OF THE INVENTION (1) Field of the Invention

The present invention relates to a transmission system for a tractor, particularly an agricultural tractor, in which a transmission gearing including propelling line and power takeoff line change speed mechanisms is operatively connected through a tubular outer shaft and an inner shaft mounted in the outer shaft to a double clutch connected to an engine output shaft.

(2) Description of the Prior Art

A known transmission system as described above is disclosed, for example, in a Japanese utility model application laid open under No. 56-12142. In the known transmission system, the inner and outer shafts operatively connected to the double clutch constitute parts of the propelling and power takeoff lines, respectively. The double clutch is operable by a first level pedal depression to break drive transmission to the propelling line and by a further, second level pedal depression to break drive transmission to the power takeoff line. Thus, a change speed operation for changing a traveling speed of the tractor while engaging in an agricultural or other operation is carried out by the first level pedal depression which breaks only the drive transmission to the propelling line and permits the power takeoff line to remain in a driven state.

Since in the above transmission system the outer and inner shafts have considerable lengths, bearing bushings are often provided between the two shafts in order to maintain a coaxial relationship therebetween. However, when only the drive transmission to the inner shaft is broken to effect the change speed operation on the propelling line, the bushings provided between the two shafts act to transmit to the inner shaft a rotational force of the outer shaft of the power takeoff line remaining in the driven state. This results in the inner shaft rotating together with the outer shaft, whereby the propelling line is maintained at too high a rotational rate for a smooth operation to be effected for changing the traveling speed of the tractor.

In order to overcome the above inconvenience, the known transmission system comprises a propelling line change speed gearing including a vane wheel rotatable in lubricating oil stored in a transmission case. According to this construction, when only the drive transmission to the propelling line is broken, the oil applies a stir resistance to the vane wheel to promptly reduce the rotation of the propelling line.

In the case of utilizing such a stir resistance, however, a desired resistance is secured only by means of a large vane wheel. Therefore, the above construction is available only to tractors having a sufficient accommodating space in the transmission case.

SUMMARY OF THE INVENTION

The object of the present invention is to provide a transmission system as noted in the introduction hereof and having a simple construction to permit a smooth change speed operation to be effected by preventing the inner shaft from rotating with the outer shaft when drive transmission to the inner shaft is broken.

The foregoing object is accomplished in one embodiment by providing a transmission having a propelling line and a power takeoff line, comprising an engine output shaft, a double clutch connected to the engine output shaft for transmitting engine output to the propelling line and/or the power takeoff line, a transmission gearing including a propelling line change speed mechanism having a reversing gear and a reversing shaft for supporting the reversing gear, and a power takeoff change speed mechanism, connecting shaft means for connecting the double clutch to the transmission gearing, the connecting shaft means including a tubular outer shaft and an inner shaft mounted in the outer shaft, and rotational resistance applying means provided on the reversing shaft for applying a rotational resistance to the propelling line by friction.

According to the above construction, the rotational resistance is applied to the reversing gear and this is effective to promptly reduce rotation of shafts in the propelling line when the double clutch is operated by a first level pedal depressure for breaking drive transmission to the propelling line.

In a preferred embodiment of the invention the tubular outer shaft has a forward end threof relatively rotatably supported in a boss portion defined on a flywheel of the double clutch connectable to the outer shaft. In this embodiment a bushing mounted between forward portions of the outer and inner shafts is dispensed with and the outer shaft is received in and supported by the flywheel. By removing the bushing which tends to frictionally transmit power between the outer and inner shafts, one of the two shafts intended to be stopped is freed from a rotational force imparted by the other shaft which remains driven by the engine.

Other advantages of the present invention will be apparent from the following description.

BRIEF DESCRIPTION OF THE DRAWINGS

The drawings illustrate a transmission system for an agricultural tractor embodying the present invention, in which.

DESCRIPTION OF THE PREFERRED EMBODIMENT

The invention will be described in greater detail hereinafter with reference to the drawings.

Figure 1:
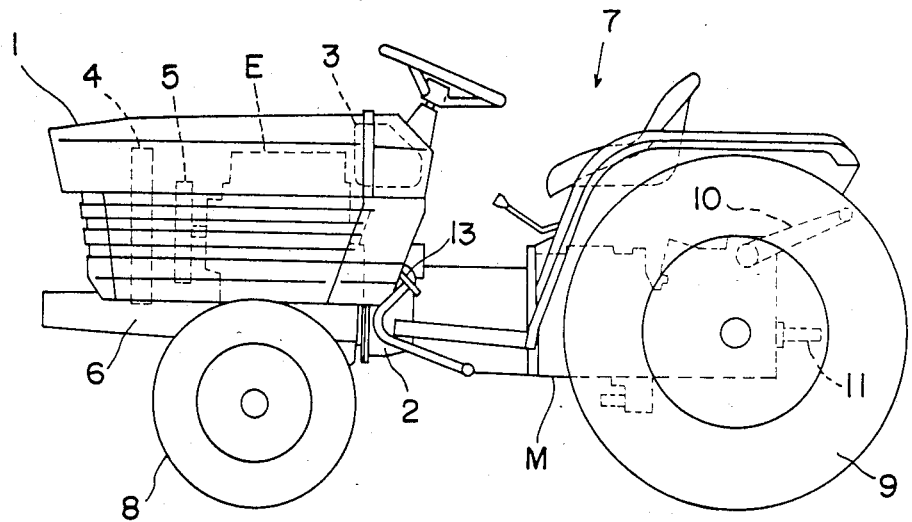
FIG. 1 is a side elevation of the tractor.

As shown in FIG. 1, an agricultural tractor comprises an engine E housed in a hood 1 at a front portion of its body, a clutch housing 2 rigidly connected to a rear end of the engine E, a fuel tank 3, a radiator 4, a cooling fan 5, and a frame 6 supporting the engine and other components. A transmission case M is mounted at a rear portion of the tractor body, which transmission case M contains a transmission gearing driven by an output shaft extending from the clutch housing 2. A driver's section 7 is provided at an approximately mid-position of the tractor body which is supported by front wheels 8 and rear wheels 9. The tractor further comprises a lift arm 10 for raising and lowering a working implement such as a rotary plow attached to the rear end of its body, and a power takeoff shaft 11 for driving the working implement.

Figure 2:
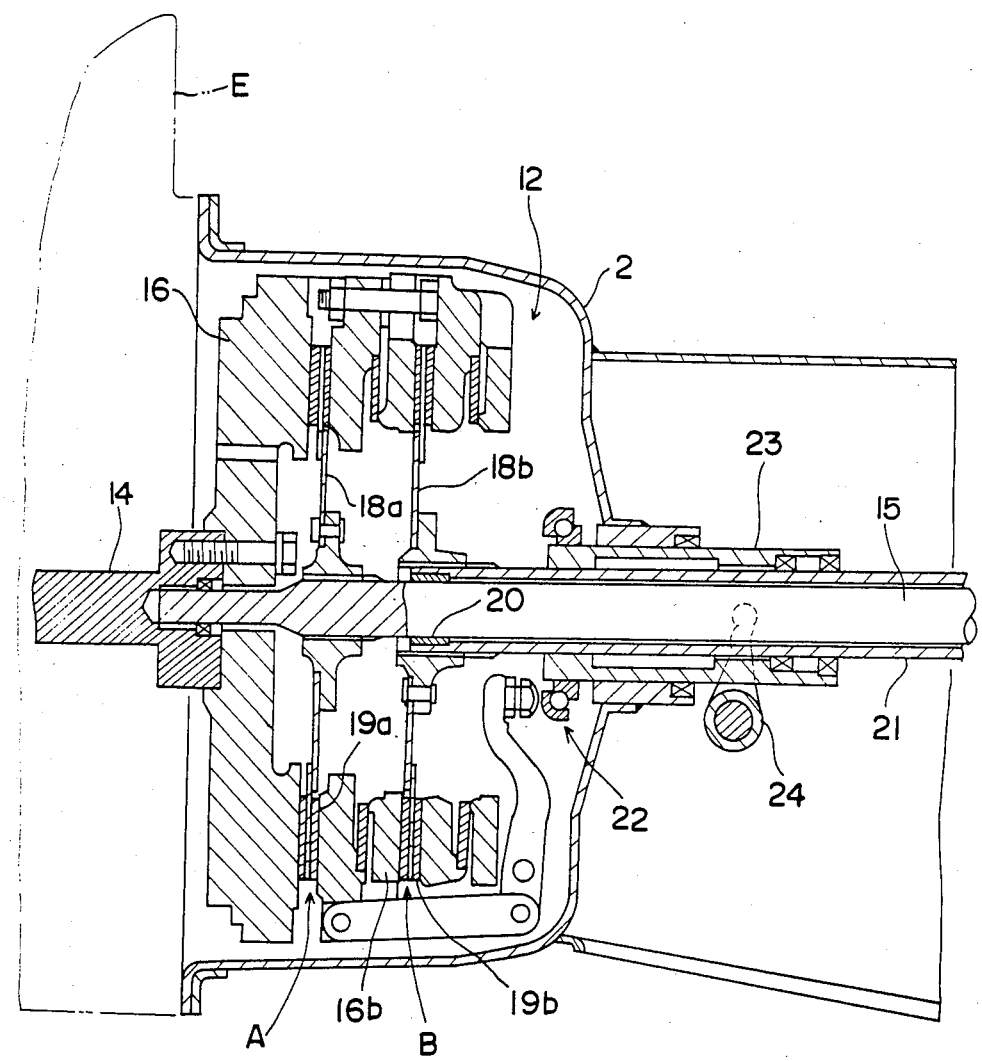
FIG. 2 is a side view in vertical section of a double clutch portion of the transmission system.

Referring to FIG. 2, the clutch housing 2 contains a double clutch 12 operatively connected to a clutch pedal 13 provided in the driver's section 7 (FIG. 1). The double clutch 12 includes a first clutch A for establishing and breaking drive transmission to a propelling line, and a second clutch B for establishing and breaking drive transmission to a power takeoff line. When the clutch pedal 13 is depressed to a first level, only the first clutch A is disengaged to break the drive transmission to the propelling line. When the clutch pedal 13 is further depressed to a second level, the second clutch B is disengaged in addition to the first clutch A thereby breaking the drive transmission to the power takeoff line also.

More particularly, the first clutch A includes a first flywheel 16 rotatable in unison with an output shaft 14 of the engine E, an inner shaft 15 having one end thereof relatively rotatably supported by the first flywheel 16, a first disk 18a splined to the inner shaft 15, and a first pressure plate 19a for pressing the first disk 18a against the first flywheel 16. The second clutch B includes a second flywheel 16b fixed to the first flywheel 16, an outer shaft 21 mounted on and supported through a bushing 20 by the inner shaft 15, a second disk 18b splined to the outer shaft 21, and a second pressure plate 19b for pressing the second disk 18b against the second flywheel 16b. A release mechanism 22 is connected to the first pressure plate 19a at plural peripheral positions thereof for disengaging the first clutch A and second clutch B. The release mechanism 22 is operable to withdraw the first pressure plate 19a toward the transmission case M thereby releasing the first disk 18a and subsequently to withdraw the second pressure plate 19b toward the transmission case M thereby releasing the second disk 18b. The release mechanism 22 is actuated by a clutch release hub 23 axially slidably mounted on the outer shaft 21, such that the clutch release hub 23 is slidable toward the engine E to cause the release mechanism 22 to disengage the first clutch A and second clutch B. The clutch release hub 23 is slidable by pivotal movements of a clutch release fork 24 interlocked with the clutch pedal 13.

Figure 4:
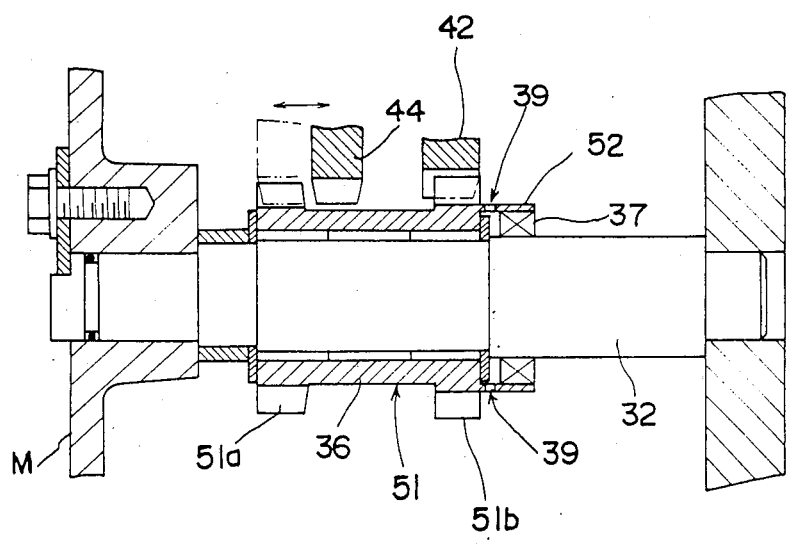
FIG. 4 is a side view in vertical section of a reversing shaft portion.
Figure 3A:
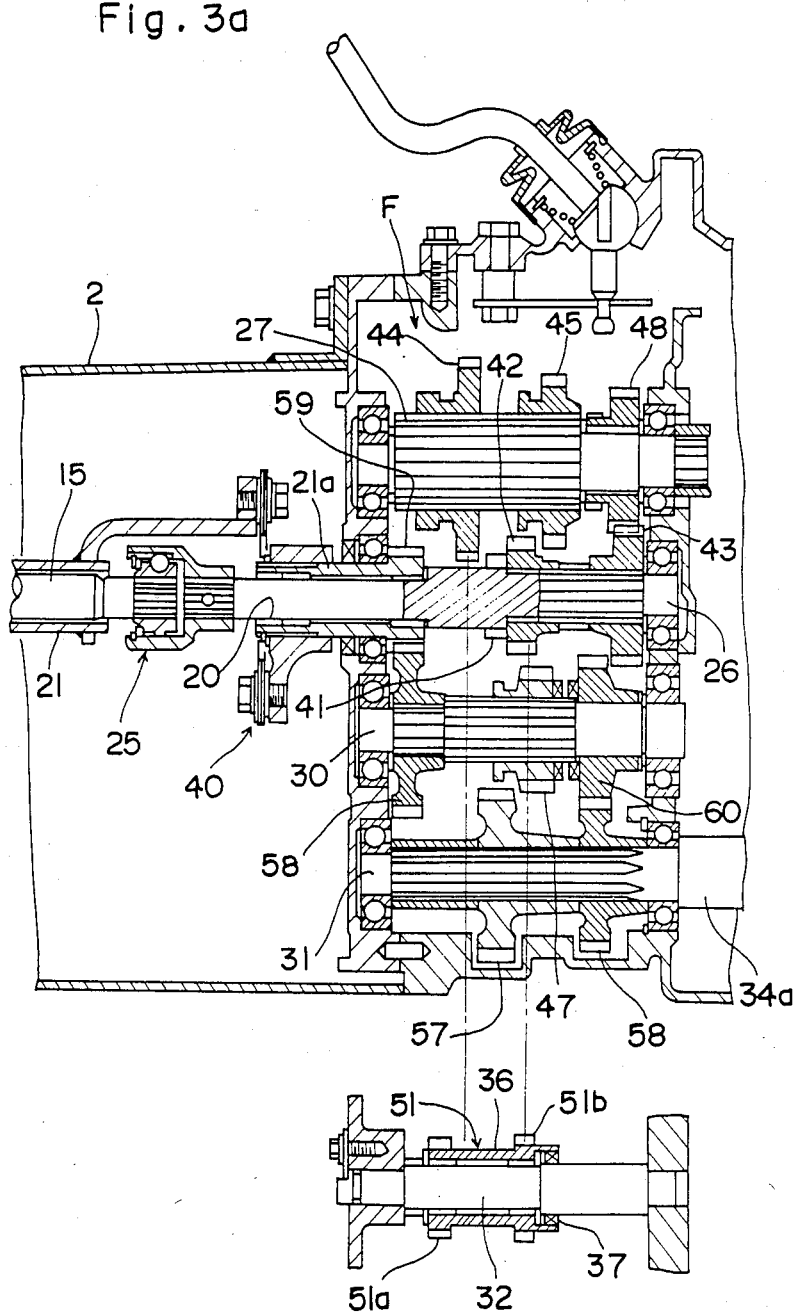
FIGS. 3a–3c are side views in vertical section of a transmission gearing.
Figure 3B:
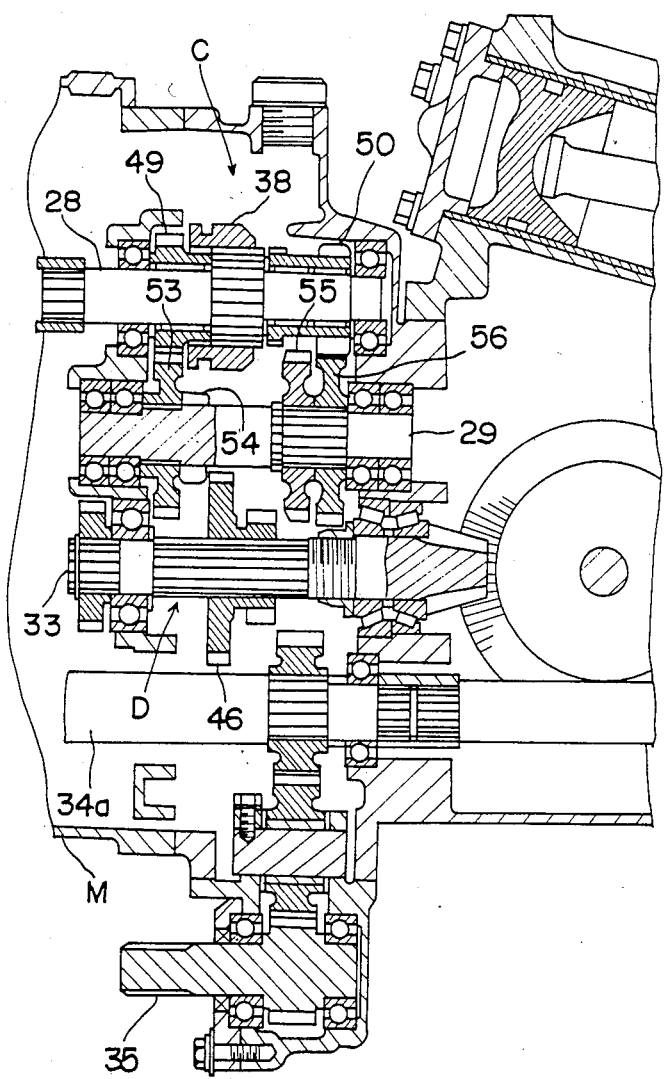
Figure 3C:
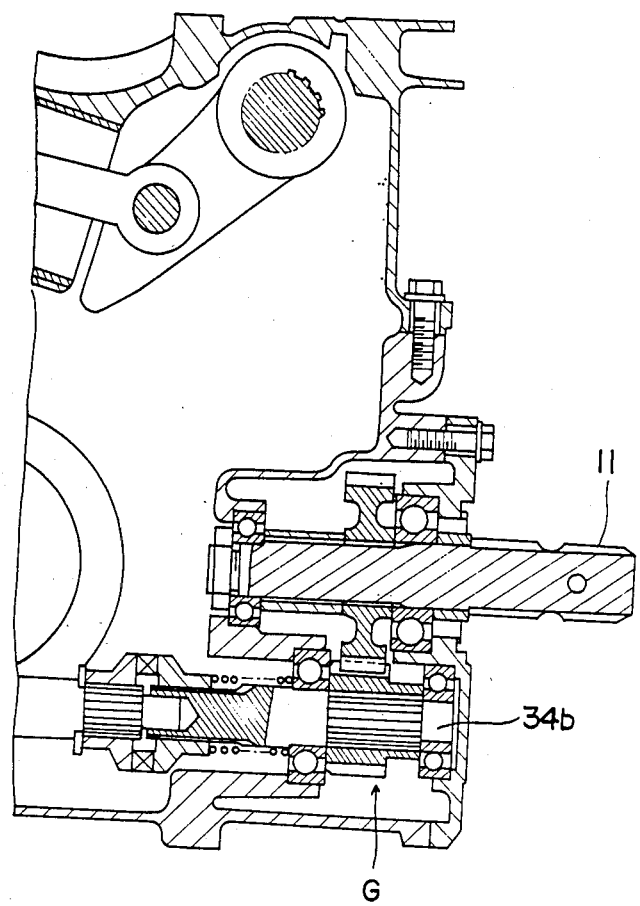

Referring to FIG. 3 showing the transmission gearing, the propelling line comprises a main change speed mechanism F including a first shaft 26 connected to the inner shaft 15 through a ball coupling 25, the first shaft 26 carrying a first, a second and a third drive gears 41–43 rotatable in unison with the first shaft 26. A second shaft 27 is provided parallel to the first shaft 26 and carrying a first and a second shift gears 44 and 45 splined thereto and a first free rotation gear 48 in constant mesh with the third drive gear 43. A reversing gear 51 which is also shown in FIG. 4 includes a first gear portion 51a engageable with the first shift gear 44 and a second gear portion 51b in constant mesh with the second drive gear 42. The first shift gear 44 is shiftable leftward in FIG. 3 into engagement with the first gear portion 51a of reversing gear 51 to provide a backward drive, and rightward into engagement with the first drive gear 41 to provide a first forward speed. The second shift gear 45 is shiftable leftward into engagement with the second drive gear 42 to provide a second forward speed, and rightward into engagement with the first free rotation gear 48 to provide a third forward speed.

A first auxiliary change speed mechanism C is provided downstream of the main change speed mechanism F. The first auxiliary change speed mechanism C includes a third shaft 28 coupled to the second shaft 27 and carrying a second and a third free rotation gears 49 and 50 relatively rotatably mounted thereon and a sleeve 38 splined thereto. The sleeve 38 is shiftable leftward to cause the second free rotation gear 49 to rotate in unison with the third shaft 28 and rightward to cause the third free rotation gear 50 to rotate in unison with the third shaft 28.

The propelling line further comprises a second auxiliary change speed mechanism D which includes a first to a fourth intermediate gears 53–56 mounted on a fourth shaft 29 to be rotatable in unison therewith. The first intermediate gear 53 is in constant mesh with the second free rotation gear 49, and the fourth intermediate gear 56 is in constant mesh with the third free rotation gear 50. A propelling drive output shaft 33 parallel to the fourth shaft 29 carries a third shift gear 46 splined thereto to be shiftable leftward into mesh with the second intermediate gear 54 and rightward into mesh with the third intermediate gear 55. Thus, the first and second auxiliary change speed mechanisms C and D in combination provide four different speeds.

The outer shaft 21 of the power takeoff line includes a rear shaft portion 21a supported by the transmission case M and connected to the outer shaft 21 by a flexible coupling 40. The rear shaft portion 21a carries a drive gear 59 in constant mesh with a first driven gear 58 splined to a fifth shaft 30 extending parallel to the rear shaft portion 21a and first shaft 26. The fifth shaft 30 further carries a fourth shift gear 47 splined thereto and a fourth free rotation gear 60 relatively rotatably mounted thereon. The fourth shift gear 47 is shiftable leftward into engagement with a fifth intermediate gear 57 splined to a sixth shaft 31, and rightward into engagement with the fourth free rotation gear 60 which is in constant mesh with a sixth intermediate gear 58 splined to the sixth shaft 31. Accordingly, the drive for the power takeoff line may be transmitted to the sixth shaft 31 in two speeds by selectively shifting the fourth shift gear 47 leftward and rightward.

Two transmission shafts 34a and 34b are connected in series rearwardly of the sixth shaft 31. The forward shaft 34a of the two transmission shafts is operatively connected through gears to a mid-PTO shaft 35 extending forwardly from a bottom position of the transmission case M. The rear transmission shaft 34b is operatively connected through a reduction gearing G to the power takeoff shaft 11 extending rearwardly from the transmission case M, whereby output of the outer shaft 21 is transmitted to the power takeoff shaft 11 for driving the working implement.

The foregoing construction according to the present invention includes means, as hereinafter described, to promptly brake or reduce rotation of the inner shaft 15 of the propelling line when only the first clutch A is disengaged.

Referring to FIG. 4, the reversing gear 51 is supported by a stationary reversing shaft 32 and includes a tubular portion 52 formed integral with a boss 36 of the reversing gear 51. As seen, the tubular portion 52 has a larger diameter than the reversing shaft 32 and projects from a righthand end of the boss 36. An annular oil seal 37 is press fit between the tubular portion 52 and the reversing shaft 32. Thus, the oil seal 37, the stationary reversing shaft 32 and the reversing gear 51 generate a frictional force therebetween which is applied as a frictional resistance to the rotation of inner shaft 15 operatively connected to the reversing gear 51. The tubular portion 52 defines perforations 39 at several positions peripherally thereof to permit oil in the transmission case M to be applied to a position of relative rotation between the boss 36 and the reversing shaft 32.

Figure 5:
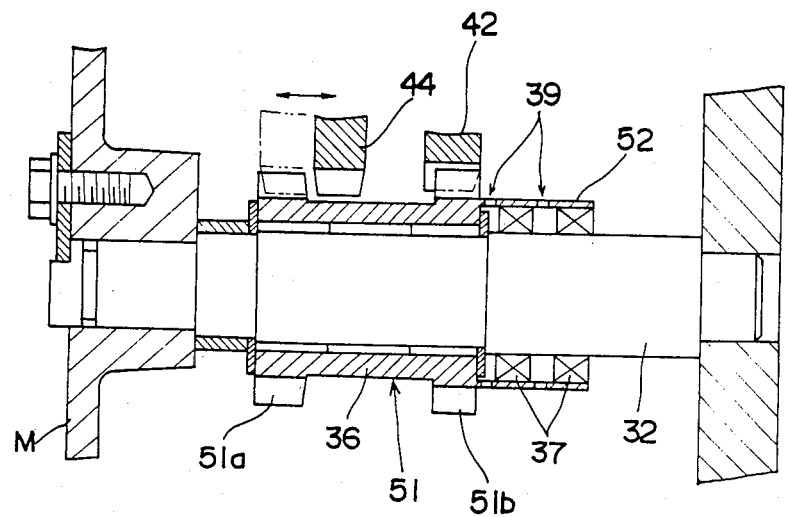
FIG. 5 is a side view in vertical section of a modified reversing shaft portion.

FIG. 5 shows a modification in which a plurality of oil seals 37 are inserted between the tubular portion 52 and the reversing shaft 32. This construction is effective to impart a greater frictional resistance to the inner shaft 15 than the construction of FIG. 4.

Figure 6:
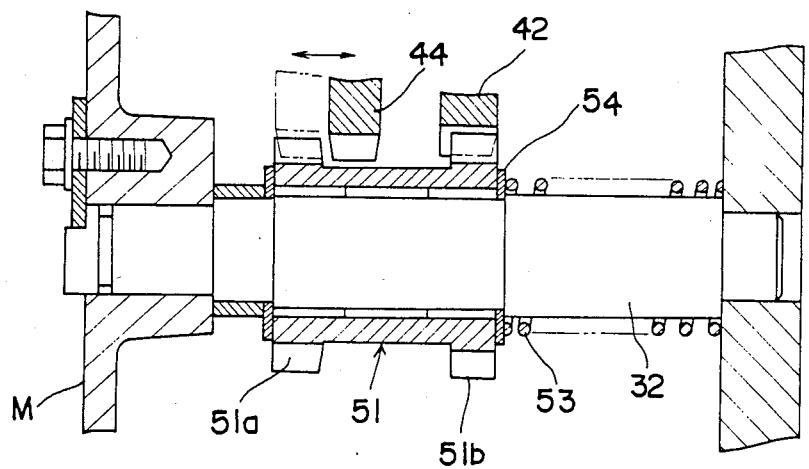
FIG. 6 is a side view in vertical section of a further modified reversing shaft portion.

FIG. 6 shows a further example of means to impart the frictional resistance to the inner shaft 15. This construction includes a helical spring 53 mounted on the reversing shaft 32. The spring 53 has one end thereof supported by an inside wall of the transmission case M and the other end thereof attached to a thrust collar 54 slidably mounted on the reversing shaft 32. The spring 53 urges the thrust collar 54 against an end of the reversing gear 51 to impart a frictional resistance to the rotation of reversing gear 51. The helical spring 53 may be replaced by a plate spring or a C-ring spring for pressing the thrust collar 54 against the reversing gear 51.

According to the present invention, as described above, the rotational rate of inner shaft 15 is promptly reduced by applying a resistance to the reversing gear 51. This resistance suppresses drive transmitted from the outer shaft 21 through the bushing 20 to the inner shaft 15 when only the first clutch A of the propelling line is disengaged and the first and second shift gears 44 and 45 are shifted to neutral. Moreover, since the reversing gear 51 rotates at a relatively high speed, the invention has the advantage of generating an effective rotational resistance even if the oil seal or seals 37 are press fit into position with a small force or the thrust collar 54 is pressed against the reversing gear 51 with a small force.

Figure 7:
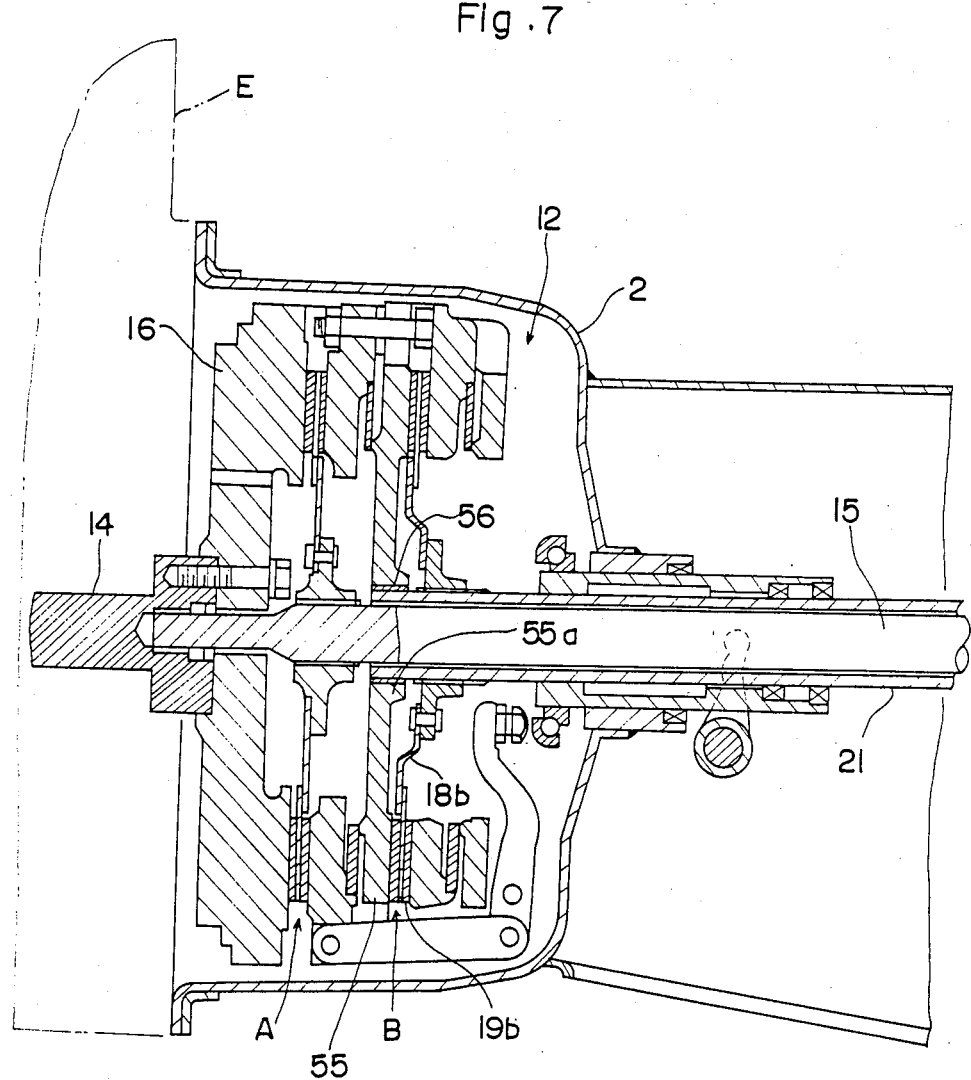
FIG. 7 is a side view in vertical section of a modified double clutch portion.

FIG. 7 shows a modified clutch portion which promotes the above advantage still further. In the illustrated construction, the second flywheel 55 defines a boss portion 55a centrally thereof, and the outer shaft 21 is relatively rotatably supported at a forward end thereof by the boss portion 55a through a bushing 56. This construction has an advantage over the construction in which the forward end of the outer shaft 21 is supported through a bushing by the inner shaft, insomuch as the frictional drive transmission from the outer shaft 21 to the inner shaft 15 is reduced thereby permitting the latter to be braked more effectively. That is to say, the rotational rate of the inner shaft 15 constituting part of the propelling line is promptly reduced when the double clutch is operated by the first level pedal depression.

What is claimed is:

1. A transmission having a propelling line and a power takeoff line, comprising:
   an engine output shaft,
   a double clutch connected to said engine output shaft for transmitting engine output to said propelling line and/or said power takeoff line,
   a transmission gear means including a propelling line change speed mechanism having a reversing gear and a reversing shaft for supporting said reversing gear, and a power take off change speed mechanism, said reversing gear operatively connected to said propelling line,
   connecting shaft means for connecting said double clutch to said transmission gear means, said connecting shaft means including a tubular outer shaft and an inner shaft mounted in said outer shaft, and
   rotational resistance applying means provided on said reversing shaft for applying a rotational resistance to said reversing gear by friction.

2. A transmission as claimed in claim 1 wherein said inner shaft constitutes part of said propelling line and said outer shaft constitutes part of said power takeoff line.

3. A transmission as claimed in claim 2 wherein said double clutch is operable by a first level pedal depression to break the power transmission to said propelling line and by a further, second level pedal depression to break the power transmission to said power takeoff line.

4. A transmission as claimed in claim 1 wherein said rotational resistance apply includes a contact member for abutting on a side face of said reversing gear, and a spring mounted on said reversing shaft for biasing said contact member into pressure abutment on said reversing gear.

5. A transmission as claimed in claim 1 wherein said reversing gear is relatively rotatably mounted on said reversing shaft, and said rotational resistance applying means includes at least one friction applying oil seal mounted between said reversing shaft and a boss portion of said reversing gear.

6. A transmission having a propelling line and a power takeoff line, comprising;
   an engine output shaft,
   a double clutch connected to said engine output shaft and including a first and a second flywheels for transmitting engine output to said propelling line and/or said power takeoff line,
   a transmission gear means including a propelling line change speed mechanism having a reversing gear and a reversing shaft for supporting said reversing gear, and a power takeoff change speed mechanism, said reversing gear operatively connected to said propelling line,
   connecting shaft means for connecting said double clutch to said transmission gear means, said connecting shaft means including a tubular outer shaft connectable to said second flywheel and an inner shaft mounted in said outer shaft and connectable to said first flywheel, and
   rotational resistance applying means provided on said reversing shaft for applying a rotational resistance to said reversing gear by friction,
   wherein said outer shaft has a forward end thereof relatively rotatably supported in a boss portion defined on said second flywheel.

7. A transmission as claimed in claim 6 wherein said double clutch is operable by a first level pedal depression to break the power transmission to said propelling line and by a further, second level pedal depression to break the power transmission to said power takeoff line.

* * * * *

UNITED STATES PATENT AND TRADEMARK OFFICE
CERTIFICATE OF CORRECTION

PATENT NO. : 4,741,227

DATED : May 3, 1988

INVENTOR(S) : Shunzo Yamada, Satoshi Fujita and Kiyokazu Nakanishi

It is certified that error appears in the above-identified patent and that said Letters Patent is hereby corrected as shown below:

In the Abstract Lines 8-9 "rotatable" should read --rotatably--.

Column 2 Line 22 "threof" should read --thereof--.

Column 6 Line 24 "apply includes" should read --applying means includes--.

Signed and Sealed this

Seventeenth Day of January, 1989

Attest:

DONALD J. QUIGG

*Attesting Officer*  *Commissioner of Patents and Trademarks*